(12) United States Patent
Sparrow et al.

(10) Patent No.: US 6,768,971 B1
(45) Date of Patent: Jul. 27, 2004

(54) INSTANTANEOUS MEASUREMENT OF SIGNAL POLARIZATION

(75) Inventors: Mitchell Joseph Sparrow, Wayne, NJ (US); Joseph Cikalo, Nutley, NJ (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 110 days.

(21) Appl. No.: 09/850,371

(22) Filed: May 7, 2001

(51) Int. Cl.$^7$ .............................................. H01Q 21/06
(52) U.S. Cl. ........................ 702/189; 702/31; 702/32; 702/57; 702/64; 702/69; 702/72
(58) Field of Search .............................. 702/28, 31, 32, 702/38, 40, 49, 57, 64, 69, 72, 189, FOR 103–FOR 104, FOR 106, FOR 110; 342/2, 17, 61, 62, 83, 131, 175, 188, 189, 190, 361, 364, 442; 455/60, 137, 139

(56) References Cited

U.S. PATENT DOCUMENTS

| | | | | |
|---|---|---|---|---|
| 4,107,678 A | * | 8/1978 | Powell ........................ | 342/62 |
| 4,295,140 A | * | 10/1981 | Frosch et al. ................ | 342/363 |
| 4,556,888 A | * | 12/1985 | McNaul ....................... | 342/362 |
| 4,851,847 A | * | 7/1989 | Clarkson ..................... | 342/17 |
| 4,870,424 A | * | 9/1989 | Lalezari et al. .............. | 342/379 |
| H1033 H | * | 3/1992 | Willey et al. ................. | 342/17 |
| 5,142,501 A | * | 8/1992 | Winterstein .................. | 367/75 |
| 5,311,192 A | * | 5/1994 | Varga et al. ................. | 342/188 |
| 5,483,240 A | * | 1/1996 | Hsu et al. ...................... | 342/17 |
| 5,541,603 A | * | 7/1996 | Read et al. ................... | 342/13 |
| 5,600,326 A | * | 2/1997 | Yu et al. ....................... | 342/17 |
| 6,037,897 A | * | 3/2000 | Rittenbach ................. | 342/169 |
| RE37,877 E | * | 10/2002 | Ghose et al. ................. | 342/16 |

FOREIGN PATENT DOCUMENTS

| | | | | |
|---|---|---|---|---|
| JP | 60228979 A | * | 11/1985 | ............. G01S/7/36 |
| JP | 60228981 A | * | 11/1985 | ............. G01S/7/36 |

* cited by examiner

*Primary Examiner*—Marc S. Hoff
*Assistant Examiner*—Carol S. Tsai
(74) *Attorney, Agent, or Firm*—RatnerPrestia

(57) ABSTRACT

A polarization measurement system and method that determines the polarization of a received signal within one received pulse. The polarimeter accepts series of samples representing horizontal and vertical signal components representing the polarization of a received signal. The samples are discrete time measurements, with each sample representing a magnitude separated in time by a predetermined angular resolution. The samples are combined with other samples in numerous sets of calculations operating in parallel, the various sets of calculations employing different transfer functions, so as to produce numerous series of output values. Characteristics of these series are examined to select a particular series, and thus select the transfer function which provided the series having a desired characteristic such as a best null. The parameters of the transfer function which provides the desired characteristic provide information representative of the signal polarization.

14 Claims, 4 Drawing Sheets

INSTANTANEOUS MEASUREMENT OF SIGNAL POLARIZATION

BACKGROUND OF THE INVENTION

The present invention relates to apparatus and methods for determining the polarization of electromagnetic signals.

Electromagnetic signals such as radio waves and light have a property referred to as polarization. Radar operates by transmitting an electromagnetic signal to a target and comparing the signal reflected from the target with the transmitted signal. In modern electronic warfare, targets avoid detection from enemy radar by using various countermeasures such as, jamming an enemy radar signal impinging on the target with a signal denying range information to the enemy and creating false reflected signals to deceive the enemy radar system. To be effective, the signals created by the countermeasure system should have characteristics such as polarization corresponding to the signal characteristics expected by the enemy system as, for example, characteristics of the return signals expected by an enemy radar system. In some cases, the enemy radar may change its signal polarization rapidly. Such a radar system is referred to as a "polarization agile." If the enemy radar is polarization agile, the countermeasure system must be capable of determining the polarization of the transmitted signal rapidly, so that the countermeasure system can change the signals which it emits. For example, a jamming system carried on an aircraft and intended to defeat a polarization agile enemy radar system should determine the polarization of the incoming radar signal and alter the polarization of the jamming signal accordingly. If the jamming system does not do this, the jamming signal will not match the polarization of the return signals from the aircraft. The enemy radar receiver can reject the jamming signals and acquire meaningful return signals. Delay in measuring the incoming signal polarization can allow the enemy system to acquire meaningful return signals for a sufficient time to find the position of the aircraft. Conversely, where a radar or communications system must overcome enemy jamming, it is desirable to measure the polarization of the jamming signal and transmit the radar or communications signal with a different polarization.

However, traditional polarization measuring techniques do not provide polarization measurements rapidly enough to counteract a polarization agile enemy system. Just as the receiving system becomes accustomed to one polarization, the enemy system changes polarization.

At a given point in space along the path of an electromagnetic wave and at a given instant in time, an electric field points in a particular direction, denoted by a vector, $\vec{E}$. This vector is perpendicular to the direction of travel of the signal or "propagation vector." The polarization of an electromagnetic wave is described by the orientation of the electric field vector and the manner in which this vector varies with time.

The polarization vector can be split into components $E_x$ and $E_y$ along orthogonal x and y axes perpendicular to the direction of travel of the electromagnetic wave. The component along the x axis commonly is referred to as the "horizontal" component, whereas the component along the y axis is referred to as the "vertical" component. Although these terms are used herein, it should be appreciated that these directions may be arbitrary directions unrelated to the normal gravitational frame of reference. At any given point in space, $E_x$ and $E_y$ vary with time. For example, for a sinusoidal wave having frequency $\omega$, $E_x = A\sin(\omega t)$ and $E_y = B\sin((\omega t)+\alpha)$, where $\alpha$ is time, a is a phase difference and A and B are the magnitudes of the $E_x$ and $E_y$ components. When the $E_x$ and $E_y$ components are in phase ($\alpha=0$), the electric field is linearly polarized. In this condition, the electric field vector at a given point always lies on the same plane. When the $E_x$ and $E_y$ components are out of phase ($\alpha \neq 0$), elliptical polarization results. When the $E_x$ and $E_y$ components of an elliptically polarized electromagnetic signal are of equal magnitude (A=B) and are 90° or 270° out of phase, the signal is said to be circularly polarized.

To measure signal polarization, a dual-aperture (polarized) antenna and a device known as a polarimeter are required. The dual-aperture antenna provides one electrical signal $V_h$ representing the $E_x$ or horizontal component of the electric field of a signal impinging on the antenna, and another electrical signal $V_v$ representing the $E_y$ or vertical component of the electric field of the same signal. These signals typically are amplified and filtered separately in a dual-channel receiver before passing to the polarimeter. The polarimeter compares these signals to determine their relative magnitudes and the phase difference between them.

A prior art analog polarimeter is shown in FIG. 1. The horizontal signal $V_h$ is supplied to one input of a four port directional coupler 200 of a type referred to as a "hybrid." The vertical signal $V_v$ is supplied to the input of a phase shifter 202 which applies a known phase shift $\phi$ to that signal. The phase-shifted signal is supplied to another input of the directional coupler 200. The coupler 200 provides a signal at a first output 204 representing the coupled power output or sum of the input signals supplied to the circuit, and also provides a signal representing a specific phase shift between the input signals at a second output 206. In this prior art example, the phase shift is 180°. The first or sum output 204 of circuit 200 is supplied to the input of a further phase shifter 208 which applies a known phase shift. The output of this phase shifter is connected to one input of another directional coupler 210, which is similar to the first 200. The second or difference output 206 of combining circuit 200 is connected directly to the other input of combining circuit 210. Thus, when time-varying $V_v$ and $V_h$ signals are applied to the polarimeter, one time-varying output signal, referred to as the $\Delta$ signal appears at the difference output 212 of coupler 210. Another time-varying output signal referred to as the $\Sigma$ signal, appears at the sum output 214 of coupler 210. The output signals are supplied to a dual channel receiver and logarithmic amplifier 216 which monitors the amplitudes of these signals and provides a signal representing a ratio between their amplitudes. This ratio signal is supplied to a null adaptive tracker 218, which adjusts the phase differences $\phi$ and applied by the phase shifters to achieve a null condition as discussed below.

The relationships between the $\Delta$ and $\Sigma$ output signals appearing at outputs 212 and 214 and the input signals $V_v$ and $V_h$ are referred to as the "transfer functions" of the polarimeter. These transfer functions depend on the phase shifts $\phi$ and $\gamma$ applied by phase shifters 202 and 208. Conversely, there is a relationship between the transfer functions which yield output signals with particular characteristics and the phases and amplitudes of $V_v$ and $V_h$. Stated another way, there is a relationship between the phase shifts $\phi$ and $\gamma$ which yield particular output signal characteristics and the phases and amplitudes of the input signals $V_v$ and $V_h$.

In particular, for the components illustrated in FIG. 1, the ratio $$\frac{|\Delta|}{|\Sigma|}$$

between the amplitude $|\Delta|$ of the $\Delta$ output signal and the amplitude $|\Sigma|$ of the $\Sigma$ output signal will be at a minimum or null condition when:

$$\gamma = 2\tan^{-1}\left(\frac{b}{a}\right), \text{ and} \quad (1)$$

$$\phi = \frac{3\pi}{2} - \alpha. \quad (2)$$

Where:
 a is the amplitude of the horizontal component $V_h$;
 b is the amplitude of the vertical component $V_v$; and
 $\alpha$ is the phase difference between these components.
Solving for the amplitude ratio $$\frac{b}{a}$$

and phase difference $\alpha$ from the $\gamma$ and values, $$\frac{b}{a} = \tan\left(\frac{\gamma}{2}\right), \text{ and} \quad (3)$$

$$\alpha = \phi - \frac{3\pi}{2}. \quad (4)$$

Thus, the parameters which characterize the polarization of the signal, such as the amplitude ratio $$\frac{b}{a}$$

and phase difference $\alpha$ between the components of the signal can be found from the phase shifts $\phi$ and $\gamma$ which yield the null condition or minimum ratio $$\frac{|\Delta|}{|\Sigma|}.$$

Tilt angle, $\tau$, of an elliptically polarized signal is also derivable from the polarimeter phase shift angles $\gamma$ and $\phi$ at the null condition as $$\tau = \frac{1}{2}\tan^{-1}\left[\tan(2\gamma)\cos\left(\phi - \frac{3\pi}{2}\right)\right]. \quad (5)$$

In operation, tracker 218 sets phase shifter 208 to hold $\gamma$ constant at an arbitrary value and adjusts phase shifter 202 to vary $\phi$ in an iterative or trial-and-error process until the output ratio $$\frac{|\Delta|}{|\Sigma|}$$

is at a minimum for the arbitrary value of $\gamma$. The tracker 218 then holds $\phi$ constant and adjusts phase shifter 208 to vary $\gamma$ in a further iterative process until the true minimum or null condition is found.

Other known analog polarimeters use different networks, typically including phase shifters and mixers. However, the overall principle of operation is the same. The transfer function or functions of the polarimeter is adjusted iteratively to yield output signals having predetermined characteristics, and the polarization of the signal is found from the transfer function or functions which yield those characteristics. Polarimeters of this type can provide accurate measurements of signal polarization. However, they require considerable time to perform the required iterations.

SUMMARY OF THE INVENTION

One aspect of the present invention provides apparatus for determining the polarization of a signal having vertical and horizontal components. Apparatus according to this aspect of the invention includes a first register for storing a first series of discrete values representing a series of samples of the horizontal component and a second register for storing a second series of discrete values representing a series of samples of the vertical component. The different values in each series can be denoted by an integer index. For example, a series of N horizontal sample values can be represented as A(1),A(2) . . . A(N) or, generically, A( ) where the parenthetical expression represents the index, and the vertical samples values can be represented by B( ).

The apparatus also includes a plurality of sets of calculation elements which are arranged to combine values in the first and second series with one another so as to produce one or more output values. Typically, the calculation elements are arranged to operate cyclically, so that a reference value in one series of sample values is combined with other values in the other series, in the same series, or both during each cycle of such set, to yield one or more output values for each cycle. Operation of each set of calculation elements through numerous cycles, using different values in one series of input values as the reference value, yields one or more series of output values. Each set of calculation elements has one or more transfer functions specifying the manner in which different samples in the series are combined with one another. These transfer functions typically include one or more integer offsets specifying the differences between the index of the reference value used on a particular cycle and the index of each other value to be combined with the reference value on that cycle. Preferably, the transfer functions used by different sets of calculation elements are different from one another. At least some of these different sets of calculation elements are arranged to operate in parallel with one another.

The apparatus also includes an evaluation circuit connected to the various sets of computation elements. The evaluation circuit is arranged to compare one or more characteristics of the series of output values generated by the various sets of calculation elements with one or more preselected characteristics, and to select the series having characteristics corresponding to preselected characteristics. This selection inherently identifies the set of computation elements which provided such series, and thus identifies the offsets used in the transfer function of that set. The identified offsets provide information about the polarization of the signal.

Operation of an individual set of calculation elements, with particular offsets, is analogous to operation of an analog polarimeter with particular phase delays. However, because numerous sets of calculation elements operate in parallel with one another, the need for iteration is reduced or eliminated. Only a small number of cycles are required to determine signal polarization. Polarization measurement can be accomplished rapidly, even where many different offsets are used to provide a fine phase resolution as required for a high-accuracy polarization measurement, and even where each series of sample values includes thousands of sample values.

For example, a polarimeter according to one embodiment of the present invention includes numerous sets of calculation elements in the form of adders connected to the registers to provide transfer functions of the form:

$$\alpha(k,i,j)=A(k)-B(k+i)-[A(k+j)+B(k+i+j)], \quad (6)$$

$$\Sigma(k,i,j)=A(k)-B(k+i)+[A(k+j)+B(k+i+j)], \quad (7)$$

In these functions, k is the index of the reference sample $A(k)$ whereas i and j are the offsets and $\Delta()$ and $\Sigma()$ are two series of output values produced by each set of calculation elements. These particular transfer functions are analogous to the transfer functions of the analog polarimeter discussed above. For series of input sample values $A()$ and $B()$ corresponding to particular input signals $V_v$ and $V_h$, a set of these transfer functions with particular offsets i and j will provide series of output values $\Delta()$ and $\Sigma()$ corresponding to the $\Delta$ and $\Sigma$ output signals of the analog polarimeter of FIG. 1 using particular phase shifts $\phi$ and $\gamma$. Differences in j and i have effects analogous to differences in $\phi$ and $\gamma$, respectively. However, because the various sets of calculation elements operate in parallel with one another, it is unnecessary to vary each phase shift iteratively.

For example, in an ideal polarimeter according to this embodiment of the invention, a first group of N sets of calculation elements having transfer functions with different values of j but with the same value of i are operated in parallel, and the series of output values which yields the lowest amplitude ratio $$\frac{|\Delta|}{|\Sigma|}$$

is selected to thereby select a value of j.

That selected value of j is used in operation of a second group of M sets of calculation elements each having transfer functions with the selected value of j but with different values of i. Here again, the series of output values which yields the lowest value of $$\frac{|\Delta|}{|\Sigma|}$$

is selected, which in this case results in selection of a value i. The selected values of i and j can be converted into the polarization parameters of the signal, such as the as the amplitude ratio $$\frac{b}{a}$$

between the vertical and horizontal components, the phase difference $\alpha$ and the tilt angle $\tau$. Where each series of input sample values $A()$ and $B()$ includes K samples, the polarization of the signal can be determined in slightly more than 2K clock cycles.

Most preferably, each set of calculation elements is associated with one or more characteristic-calculation circuits, and the characteristic-calculation circuit associated with each set of calculation elements operates in parallel with the calculation elements of that set, and in parallel with the characteristic-calculation circuits associated with other sets. For example, where the characteristics of the output series which are examined include amplitude, the characteristic-calculation circuits associated with each set of calculation elements may include one or more accumulators each arranged to add an output value calculated on each cycle of the calculation elements to a total. For example, where each set of calculation elements provides a $\Delta()$ value and a $\Sigma()$ output value on each cycle, the characteristic-calculation circuits associated with each set may include one accumulator for adding the $\Delta()$ value produced on each cycle to a total $\Sigma\Delta()$ and another accumulator for adding the $\Sigma()$ value produced on each cycle to a total $\Sigma\Sigma$. Essentially, no additional time is required to calculate the amplitudes of the output signals from the various sets of calculation elements.

In a particularly preferred arrangement, the registers used to hold the series of input sample values include shift registers. The different offsets used in the transfer functions of the various sets of calculation elements are established by connecting the different calculation elements to different taps of the shift registers. The reference value used in each cycle of the calculation elements is changed by clocking the data through the shift registers.

A further aspect of the present invention provides methods of determining the polarization of a signal from a series of horizontal input sample values and a series of vertical input sample values. Methods according to this aspect of the invention desirably start with a calculating a plurality of series of output values, using a plurality of sets of transfer functions. Most preferably, calculations using at least some of the sets of transfer functions are conducted in parallel with other calculations using other transfer functions. As discussed above in connection with the apparatus, the transfer functions represent combination of samples in the two series with a reference sample value. Each transfer function includes one or more integer offsets specifying the differences between the index of the reference value used on a particular cycle and the index of each other value to be combined with the reference value on that cycle. The transfer functions in different sets desirably include different offsets. The method desirably further includes the step of evaluating one or more characteristics of the series of output values computed using the transfer functions of the different sets according to a predetermined criterion, and selecting the series produced by one sets of calculations based on such evaluation. As discussed above in connection with the apparatus, this selection implicitly selects one set of calculations and thus selects one set of offsets, from which the polarization characteristics of the signal can be determined calculation of numerous series of output values in parallel with one another minimizes the need for iteration.

Particularly preferred methods according to this aspect of the invention, one or more characteristics of each series of output values are calculated in parallel with calculation of the output values themselves. Methods according to this aspect of the invention can provide rapid polarization measurements.

Other objects and advantages of the system and method will become apparent to those skilled in the art after reading the detailed description of the preferred embodiment.

BRIEF DESCRIPTION OF THE DRAWINGS

FIG. 3 is presented as two parts, FIGS. 3a and 3b.

DETAILED DESCRIPTION OF THE INVENTION

Figure 1:
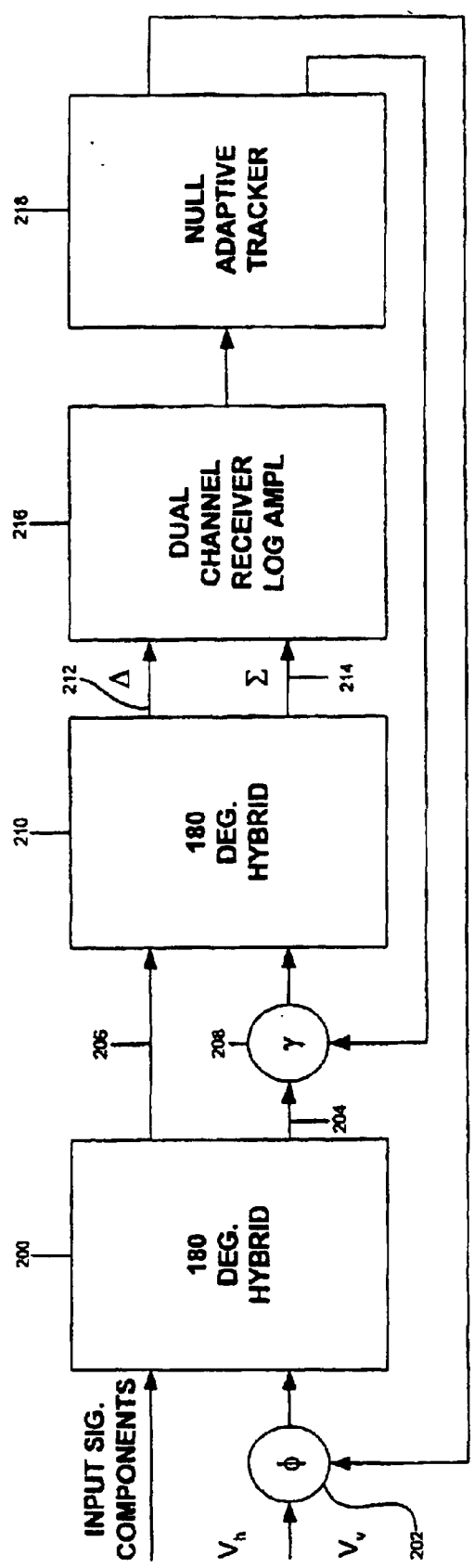
FIG. 1 is a system block diagram of a prior art polarimeter.

The embodiments will be described with reference to the drawing figures where like numbers represent like elements throughout.

Figure 2:
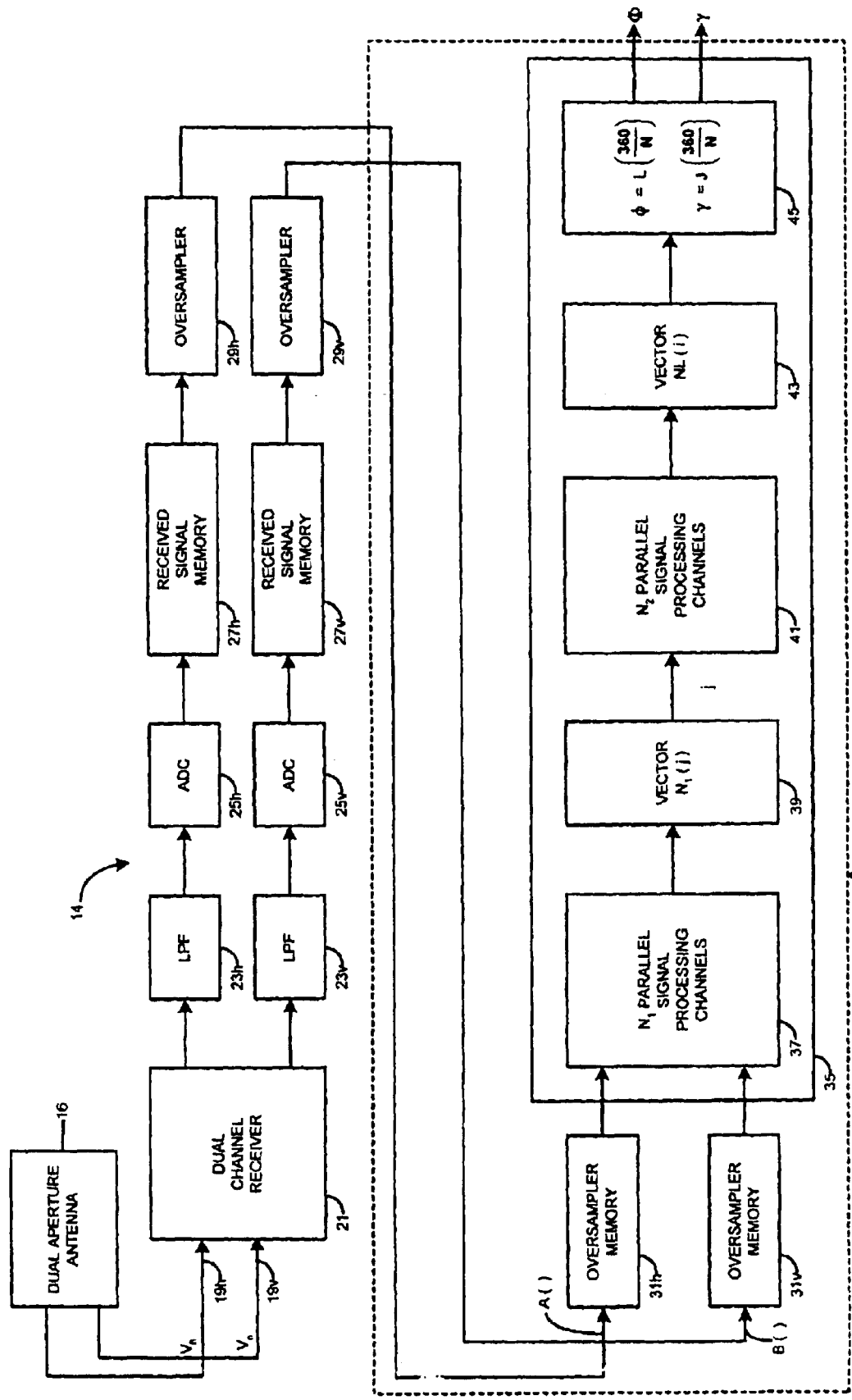
FIG. 2 is a functional block diagram of apparatus in accordance with one embodiment of the present invention.

Shown in FIG. 2 is an apparatus in accordance with one embodiment of the present invention is arranged to determine the polarization of a received radar pulse. The apparatus includes a sample preparation circuit 14 which recovers series of discrete digital sample values representing the vertical and horizontal components of the signal, and the polarimeter 17 which operates on these series to determine the polarization of the signal.

The sample preparation circuit includes a dual-aperture antenna 16 having two outputs 19h and 19v for the horizontal and vertical signal components. A dual channel receiver 21 separately downconverts the horizontal $19_h$ and vertical signal component $19_v$ to a predetermined intermediate frequency. Because the enemy radar signal may change frequency rapidly, receiver 21 desirably is a frequency-agile receiver controlled by conventional frequency-detection circuitry (not shown). The intermediate-frequency horizontal and vertical component signals are supplied by receiver 21 to low pass filters $23_h$ and $23_v$, respectively. The filtered components are separately digitized by analog-to-digital (ADC) converters $25_h$ and $25_v$.

The sampling rate of the ADC's $25_h$, $25_v$, the intermediate frequency used by receiver 21 and the pass-band of the low pass filters $23_h$, $23_v$, are selected so that the ADCs $25_h$, $25_v$ will be able to digitize the highest expected frequency output from the receiver 21 and filters 23 at a sampling rate above the Nyquist rate for that frequency, and desirably at a rate of 20 samples/cycle. The ADCs $25_h$, $25_v$ desirably quantize the filtered IF signal components with a minimum resolution of 8 bits yielding 256 quantization levels. For operation with incoming radar signals at about 6 to about 18 GHz, the intermediate frequency may be on the order of 10 MHz, and hence each ADC 25h, 25v operates at a sampling rate on the order of 200 MHz, i.e., 200 million 8-bit digital sample values per second. The ADC's may be converters of the type disclosed in commonly-assigned U.S. Provisional Patent Application Serial No. 60/164,947, filed on Nov. 12, 1999, the disclosure of which is incorporated by reference herein. A discussion of the conversion system and method is beyond the scope of this disclosure.

The sequences of vertical and horizontal component sample values produced by ADCs 25h and 25v are stored in received signal component memories 27h and 27v. These sequences are expanded or "stretched" by oversamplers 29h and 29v, which may use a conventional interpolation process to insert numerous intermediate sample values between each pair of actual sample values in each such sequence. This yields a series of horizontal sample values A( ) and a series of vertical sample values B( ), which are stored in oversampler memories 31h and 31v, respectively. In this notation, the parenthetical expression denotes an integer index, i.e., the first value in the horizontal series is denoted as A(1), the second sample is denoted as A(2), and so on.

The quality of the polarization measurement produced by polarimeter 17 depends upon the phase resolution of the system, which in turn depends upon the number of samples per cycle of the original signal present in each series. The quality of the polarization measurement is referred to as the null depth, expressed in decibels (dB). The relationship between phase resolution and null depth is $$\text{null (in dB)} = 20\log\left[(\delta\psi)\left(\frac{\text{radians}}{57.3°}\right)\right], \quad (8)$$

where δψ is phase resolution in degrees. Typically, a null depth on the order of 40 dB is desired, which implies a phase resolution of 0.5 degrees or better. To achieve this phase resolution, each series of sample values A( ) and B( ) should include 720 samples per cycle. Stated another way, within each series A( ) and B( ), each increment in the index corresponds to a given phase delay, dϕ, which is 0.5 degrees in the case where each series includes 720 samples per cycle. Sample values with the same index in the two series A( ) and B( ) desirably represent portions of the original horizontal and vertical component signals occurring at the same time, i.e., A(1) and B(1) represent the horizontal and vertical components of the signal at the same moment, A(2) and B(2) represent the horizontal and vertical components at the next moment, and so on.

Each series of sample values should include data representing more than one cycle of the original signal. In a preferred embodiment, each series of sample values represents eight full cycles of the original signal, and hence includes 5,760 (8 times 720) individual sample values. The polarimeter 17 operates on these series of sample values.

Figure 3A:
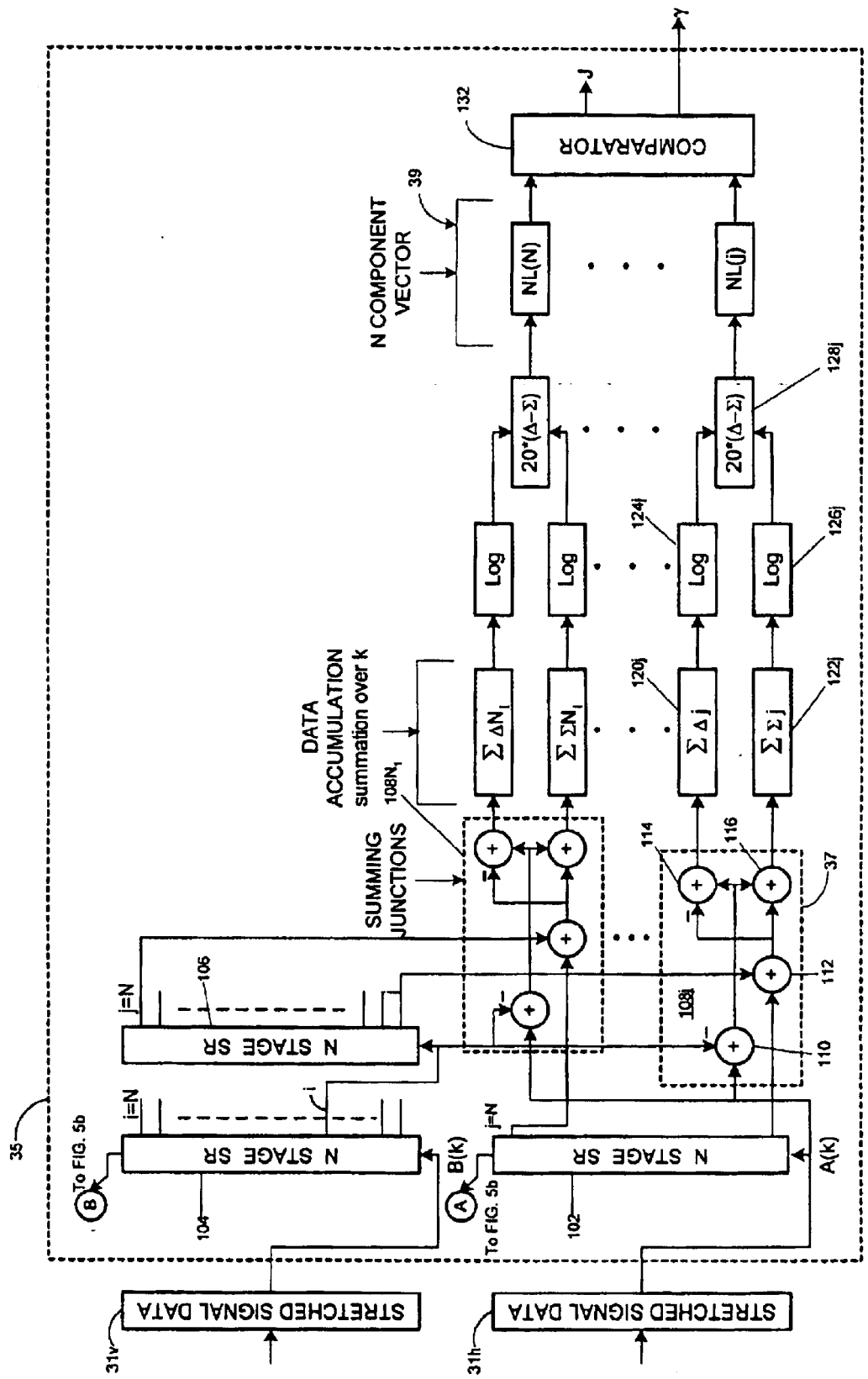
FIG. 3 is a more detailed block diagram of a portion of the apparatus shown in FIG. 2.

The polarimeter includes a first group 37 of $N_1$ "channels" or sets of computation elements. As further discussed below, each set operates with samples having different offsets or differences in index. Certain offsets used in the various sets differ from one another. For maximum phase resolution, the difference in offsets between two sets should be one index value. The differences in offsets among all of the sets used in this first group should total at least one full cycle or 360°. This arrangement is used in the embodiment illustrated. A difference in offset of one index value corresponds to 0.5°, and hence 720 sets are required to span the full 360° range. Thus, in this embodiment $N_1$ is 720. The functional interrelationships of the components constituting this group of channels and associated elements are shown in FIG. 3a. A first-stage horizontal sample shift register 102 and two first-stage vertical sample shift registers 104 and 106. Each shift register is a conventional device defining $N_1$ memory locations arranged in sequence from an input or upstream end to an output or downstream end. Each shift register has an output or tap associated with each memory location. In the conventional manner, each shift register is arranged to operate cyclically. In each cycle of operation, the value at each memory location is supplied through the output associated with that memory location and shifted to the next downstream location. Also, on each cycle of operation, a new value is accepted or "clocked into" the first memory location, whereas the value at the downstream-end memory location is shifted out of the register. Thus, each register can accept a sequence of sample values and deliver different sample values in the series from the various outputs or taps. For example, register 102 will receive the A( ) series of horizontal sample values from memory 31h. On any given cycle of operation, the index of the value A( ) delivered from the most upstream output will be lower than the index of the value A( ) delivered from an output at position downstream along the register. The difference in index corresponds to difference in position along the register. Difference in index also corresponds to a difference or delay in phase.

Register 104 will receive the series of vertical sample values B( ) from memory 31v. The input of register 106 is connected to an output of register 104 i positions downstream from the input of register 104. Thus, on any given cycle the index of the value B( ) in each position of register 106 will be offset by i from the value in the corresponding position of register 104. The value of i used is entirely arbitrary; it may be any integer between 1 and $N_1$. All of the registers operate in synchronism, so that when a particular value A(k) is in the reference position at the upstream end of register 102 when the corresponding or same-index value B(k) is at the input or upstream end of register 104.

As mentioned above, the first group of computation elements includes N1 sets of computation elements. A typical set 108j of computation elements includes a first adder 110 having a positive input connected to the reference output at the input or upstream end of horizontal sample register 102 and also having a negative input connected to the output of the vertical sample register 104 i positions downstream from the input end of that register. Thus, in a cycle when sample A(k) is at the reference value position, at the upstream end of register 102, adder 110 will receive sample A(k) through the positive input and sample B(k+i) through the negative input, and will provide an output equal to A(k)+B(k+i).

The same set 108j also includes a second adder 112 having a positive input connected to an output of horizontal sample register j positions downstream from the reference position or input end of that register and having another positive input connected to an output of register 106 j positions downstream from the input or upstream end of that register. Thus, on a cycle when sample A(k) is at the reference value position at the upstream end of register 102, the second adder 114 112 will receive samples A(k+j) and B(k+i+j) will produce an output equal to [A(k+j)+B(k+i+j)].

Set 108j also includes a third adder 114 having a positive input connected to the output of the first adder 110 and a negative input connected to the output of second adder 112. Thus, on a cycle when sample A(k) is at the reference value position at the upstream end of register 102, the third adder 114 will yield an output sample value Δ(k,i,j), where Δ(k,i,j)=A(k)−B(k+i)−[A(k+j)+B(k+i+j)]

Set 108j also includes a fourth adder 116 having positive inputs connected to the outputs of the first adder 110 and second adder 112. Again where value A(k) is at the reference value position, the fourth adder 116 will yield an output sample value Σ(k,i,j) where Σ(k,i,j)=A(k)−B(k+i)+[A(k+j)+B(k+i+j)].

Thus, as successive horizontal sample values A(k) and vertical sample values B(k) are clocked through the registers, the first set of adders will produce two series of output sample values Σ(k,i,j) and Δ(k,i,j).

Every other set of computation elements 108 is identical to set 108j discussed above, except that the value of the offset j used for each set is different. For example, for set 108$_{N1}$, the value of j is equal to $N_1$ and hence the inputs of second adder 112 are connected to outputs of registers 102 and 106 $N_1$ positions from the upstream ends of these registers. Accordingly, as successive values A(k) and B(k) are clocked through the registers, each set 108$_1$ through 108$_{N1}$ will produce a two series of output values Σ(k,i,j) and Δ(k,i,j) as discussed above, using the same value of offset i but different values of offset j.

A pair of accumulators 120 and 122 is associated with each set of adders 108. For example, the first accumulator 120j associated with set 108j receives the series of output sample values Δ(k,i,j) from the third adder 114 of that set, and adds the absolute value |Δ(k,i,j)| of the sample value for each cycle to a total $\Sigma\Delta_j$. Thus, the total accumulates over successive cycles, i.e., over the various values of k. Likewise, the second accumulator 122j associated with set 108j receives the series of output sample values Σ(k,i,j) from the fourth adder 116 of set 108j, and accumulates the total $\Sigma\Sigma_j$ equal to the sum of the absolute values |Σ(k,i,j)|. The accumulators associated with the various sets are identical, but accumulate totals for different series of output sample values resulting from different values of j.

The accumulators 120j, 122j associated with set 108j are connected to a pair of logarithm-calculating circuits 124j, 126j respectively. When actuated by a control signal, the logarithm-calculating circuits associated with will calculate the logarithms log($\Sigma\Delta_j$) and log($\Sigma\Sigma_j$). Similar logarithm-calculating circuits 124 and 126 are connected to the accumulators associated with the other sets 108. The logarithm-calculating circuits associated with set 108j are connected to a difference and multiplication circuit 128j arranged to calculate 20 [log($\Sigma\Delta_j$)−log($\Sigma\Sigma_j$)], or 20 log ($\Sigma\Delta_j/\Sigma\Sigma_j$). A similar difference and multiplication circuit 128 is associated with each set 108.

In operation, after a series of input samples A( ) and B( ) have been clocked through the registers, the logarithm circuits 124, 126 and the difference and multiplication circuit 128 associated with the various sets are actuated. The difference and multiplication circuits yield $N_1$ values forming an $N_1$ component vector 130 of the form 20 log($\Sigma\Delta_1/\Sigma\Sigma_1$) . . . 20 log($\Sigma\Delta_j/\Sigma\Sigma_j$) . . . 20 log($\Sigma\Delta_{N1}/\Sigma\Sigma_{N1}$).

A comparator circuit 132 is connected to the outputs of the difference and multiplication circuits 128, so that it receives vector 130. Comparator circuit 132 compares the components of the vector with one another to find the smallest component. That component represents the smallest ratio ($\Sigma\Delta_j/\Sigma\Sigma_j$). The comparator thus selects the value of j associated with that component and outputs that value as the selected value J.

Figure 3B:
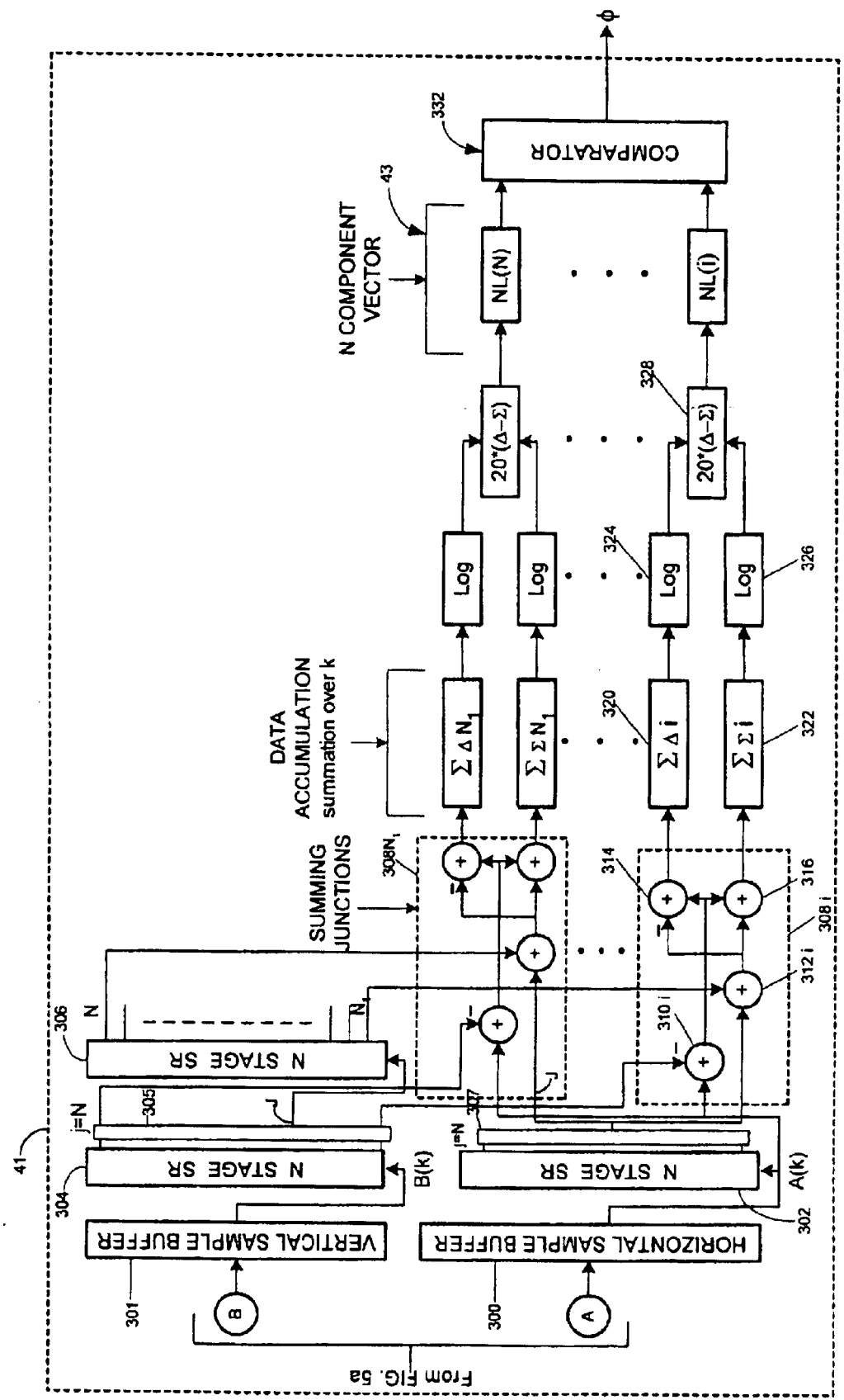

The horizontal and vertical sample values A( ) and B( ) clocked out of shift registers 102 and 104 are routed to buffers 300 and 301 (FIG. 3b), respectively and stored for use in a second group 41 of parallel processing channels or sets. Horizontal sample buffer 300 is connected to the input of a second-stage horizontal shift register 302, and the vertical sample buffer 301 is connected to the input of a first second-stage vertical shift register 304. These registers are identical to the corresponding registers 102 and 104 used in the first stage. A switching network 305 is arranged to make an input connection to any one of the outputs of vertical shift register 304. The switching network has an output connected to the input of a second vertical shift register 306. Switching network 305 is responsive to the J output of comparator 132, and receives the value of J selected by the comparator. The switching network makes its input connection to the output of register 304 J positions downstream from the input or reference end of the register. Thus, as successive vertical sample values are clocked through the register 304, a series of vertical sample values offset by J values will be clocked through register 306. Stated another way, when value B(k) appears at the reference position at the upstream end of register 304, value B(k+J) will appear at the upstream end of register 306. A similar switching network 307 is connected to register 302. This switching network is also responsive to the J output of comparator 132 in the first stage, and makes an input connection J positions downstream from the upstream or reference position of register 302. Thus, when horizontal sample value A(k) appears at the reference position of register 302, sample value A(k+J) appears at the output of switching circuit 307.

The second group of calculation elements 41 includes $N_2$ sets 308 of calculation elements operate. Here again, different sets use different offsets. However, in this second stage, the differences in offsets need only span a range of 180°. Preferably, the same one-index difference in offsets between sets is employed. Here again, each one-index difference in offsets corresponds to 0.5°. Thus, 360 sets 308 are used in this stage, i.e., $N_2=360$. Except as discussed below, each set of calculation elements 308 is identical to a set of calculation elements 108 discussed above with reference to FIG. 3a. However, the first adder 310 of each such set has its negative input connected to a different position along vertical sample register 304. For example, the negative input of first adder 310i in set 308i has its negative input connected to an output of register 304 i positions downstream from the input end of the register. Here again, the first adder 310 of each set has its positive input connected to the reference position or upstream end of horizontal sample register 302. Thus, the first adder 310 of each set will yield $A(k)-B(k+i)$, and but using different values of i in each set. The second adder 312 of each set 308 has one positive input connected to the output of switching network 307 and another positive input connected to an output of register 306. Different outputs of register 306 are used for the second adders of different sets. An output i positions downstream along register 306 is connected to the second adder of the ith set 308i. Thus, the second adder 312 of the ith set will yield $A(k+J)+B(k+i+J)$. The third adder 314 and fourth adder 316 of each set are identical to the third and fourth adders of sets 108. Thus, on successive cycles, the third adder 314 of each set will yield a series of values $\Delta(k,i,j)$ computed as discussed above except that for all sets 308 j is the same and is equal to J and i is different for the different sets. Likewise, the fourth adder 316 of each set 308 will yield a series of values $\Delta(k,i,j)$ using different values of i for each set but using the same value of j (j=J) for all sets.

A pair of accumulators 320 and 322 is associated with each set of computation elements 308. Here again, the accumulator 320 associated with each set accumulates a total of the values of $\Delta(k,i,j)$ over successive cycles or successive values of k. Because these totals for different sets are accumulated with different values of i, they are referred to by the notation $\Sigma\Delta_i$. Likewise the accumulator 322 associated with each set accumulates a total of the values of $\Sigma(k,i,j)$ over successive cycles, referred to by the notation $\Sigma\Sigma i$.

Log circuits 324 and 326, and difference and multiplication circuits 328 are also provided. These are identical to the corresponding elements 124, 126 and 128 discussed above with reference to FIG. 3a. Circuits 328 yield an $N_2$ element vector 43 of the form $20\ \log(\Sigma\Delta_1/\Sigma\Sigma_1)$ ... $20\ \log(\Sigma\Delta_i/\Sigma\Sigma_i)$ ... $20\ \log(\Sigma\Delta_{N2}/\Sigma\Sigma_{N2})$. A comparator 332 receives this vector and selects the element N(i) having the lowest value. This implicitly selects the value of i which yields such minimum value. The comparator outputs the selected value I.

Determination of I and J in this manner provides information which completely specifies the polarization of the incoming signal. The values of I and J can be converted directly to φ and γ values corresponding to those discussed above with reference to FIG. 1. Thus, $\phi=J(N_1/360)$ and $\gamma=I(N_2/180)$. These values in turn can be converted to the phase angle α, amplitude ratio b/a and tilt angle τ as discussed above with reference to FIG. 1.

The parallel processing system can compute the polarization in minimal time. In the particular embodiment discussed above, the first group of computation elements and associated accumulators provide the totals $\Sigma\Delta_j$ and $\Sigma\Sigma_j$ in a number of clock cycles equal to the number of sample values in each series, after whatever number of clock cycles are required to initially fill the shift registers used in this stage. The same number of clock cycles are required for the second stage. Added to this are the relatively few clock cycles required for operation of the elements used to transform the accumulator totals into the vectors 39 and 43, and for operation of the comparator.

Moreover, operation in the digital domain allows for parallel operation with inexpensive components in a compact arrangement. The various components of the polarimeter 17 can be embodied as one or a plurality of fixed gate arrays (FGAs), field programmable gate arrays (FPGAs), application specific integrated circuits (ASICs), digital signal processors (DSPs) and the like.

Although the various components of the polarimeter have been shown and described above as separate hardware elements for ease of understanding, this is not essential. For example, the same physical structures can be used as calculation elements and accumulators in both stages of operation. For example, the calculation elements can be "soft-connected" or connected through controllable switching devices to the buffers, so that the inputs of the calculation elements can be reconnected as desired during different stages of operation. Also, the calculation elements such as adders, as well as the accumulators, can be elements of a programmable general-purpose device, and the connections required to move the sample values can be made using appropriate software instructions for routing the data within such a device.

The embodiment illustrated above conducts all of the various sets of calculations and all of the accumulations required in each stage in parallel with one another. This can be comprised as, for example, by splitting the first stage into two or sub-stages performed seriatim. Within each sub-stage, some of the calculations and accumulations required in the first stage are performed in parallel. The number of clock cycles required for the first stage is multiplied by the number of sub-stages, but hardware requirements are reduced. The same approach can be applied to the second stage.

Conversely, the stages can be combined with one another. A two-dimensional array including $N_1 \times N_2$ sets of calculation elements and accumulators can be used in a single stage to provide a two-dimensional vector with elements corresponding to all possible values of I and J, and the element in the vector representing the best null (lowest value of 20 $\log(\Sigma\Delta/\Sigma\Sigma)_{ij}$) can be selected.

The calculation elements can use transfer functions other than those discussed above. Numerous analog polarimeters using different transfer functions are known in the art. An array of such polarimeters can be simulated using digital computations in parallel channels, with different parameters in each channel, in the same manner as described above.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

What is claimed is:

1. Apparatus for determining the polarization of a signal having vertical and horizontal components comprising:
   (a) one or more registers for storing a first series of sample values representing a horizontal component of the signal and for storing a second series of sample values representing a vertical component of the signal;

(b) a plurality of sets of cyclically operative calculation elements connected to said one or more registers, each such set being arranged to combine values in said first and second series with one another so as to provide one or more output values for each cycle, said one or more registers being arranged to supply said different ones of said sample values to each such set on successive cycles of operation, whereby each such set will provide one or more series of output values when operated through a plurality of cycles, different ones of said sets of calculation elements being arranged to combine values according to different transfer functions, at least some of said sets of calculation elements being operative in parallel with one another; and (c) one or more evaluation circuits connected to at least some of said sets of calculation elements so as to receive the series of output values provided by such sets, said one or more evaluation circuits being operative to compare one or more characteristics of at least some of said series of output values and select one or more series having preselected characteristics and thereby identify the set of calculation elements which provided such one or more series and provide information about the polarization of the signal.

2. Apparatus as claimed in claim 1 wherein said sample values in each said series have indices such that values in each said series with different indices represent a component at different times, and wherein the transfer functions used in different ones of said sets specify different offsets between the index of a reference value in one said series and the indices of one or more other values in one or both of said series combined with the reference value in each cycle.

3. Apparatus as claimed in claim 1 further comprising one or more characteristic-calculation circuits associated with each such set, each such characteristic-calculation circuit being arranged to calculate a characteristic of at least one series of output values produced by such set from the output values included in such series, the characteristic-calculation circuit associated with each set of calculation operating in parallel with the calculation elements of that set, and in parallel with the characteristic-calculation circuits associated with other ones of said sets.

4. Apparatus as claimed in claim 3 wherein each said characteristic-calculation circuit includes an accumulator for adding an output value produced in each cycle to a total of output values.

5. An apparatus for determining the polarization of a signal having two orthogonal components comprising:

(a) one or more horizontal sample registers for storing a plurality of sample values A( ) of a horizontal component of the signal, where the parenthetical expression denotes an integer index;

(b) one or more vertical sample registers for storing a plurality of sample values B( ) of a vertical component of the signal, where the parenthetical expression denotes an integer index;

(c) a plurality of sets of cyclically operative summers and accumulators, each said set including:

(i) a $\Delta$ summer connected to one or more of said horizontal sample registers and to one or more of said vertical registers and operative to calculate:

$\Delta(k,i,j)=A(k)-B(k+i)-[A(k+j)+B(k+i+j)]$, i, j and k being integers;

(ii) a $\Sigma\Delta$ accumulator connected to the $\Delta$ summer of that set operative to add the value of $\Delta(k, i, j)$ computed by such $\Delta$ summer on each cycle to a total to thereby accumulate a total $\Sigma\Delta$ over a plurality of cycles;

(iii) a $\Sigma$ summer connected to one or more of said horizontal sample registers and to one or more of said vertical registers and operative to calculate:

$\Sigma(k,i,j)=A(k)-B(k+i)+[A(k+j)+B(k+i+j)]$;

(iv) a $\Sigma\Sigma$ accumulator connected to the $\Sigma$ summer of such set and operative to add the value of $\Sigma(k, i, j)$ computed by such $\Sigma$ summer on each cycle to a total to thereby accumulate a total $\Sigma\Sigma$ over a plurality of cycles;

(e) said sets being connected to said registers such that during a first stage of operation a first group including a plurality of said sets will operate in parallel with the same value of i but with different values of j, and on each cycle k will vary and such that during a second stage of operation a second group including a plurality of said sets will operate in parallel with the same value of j but with different values of i, and on each cycle k will vary;

(f) one or more ratio-determining circuits connected to said accumulators of said sets, said one or more ratio-determining circuits including at least one circuit operative to calculate a separate ratio $$\left(\frac{\Sigma_\Delta}{\Sigma_\Sigma}\right)_j$$

for each said set in said first group resulting from said first phase of operation, whereby each such ratio $$\left(\frac{\Sigma_\Delta}{\Sigma_\Sigma}\right)_j$$

will represent a result achieved with a different value of j, said one or more ratio-determining circuits including at least one circuit operative to calculate a separate ratio $$\left(\frac{\Sigma_\Delta}{\Sigma_\Sigma}\right)_i$$

for each said set in said second group resulting from said second phase of operation, whereby each such ratio $$\left(\frac{\Sigma_\Delta}{\Sigma_\Sigma}\right)_i$$

will represent a result achieved with a different value of i, and (g) one or more comparators connected to said one or more ratio-determining circuits, at least one of said one or more comparators being operative to select the minimum ratio $$\left(\frac{\Sigma_\Delta}{\Sigma_\Sigma}\right)_j$$

and thereby select a value of i, at least one of said one or more comparators being operative to select the minimum ratio $$\left(\frac{\Sigma_\Delta}{\Sigma_\Sigma}\right)_i$$

and thereby select a value of i, said value of j in said second stage of operation being said selected value of j whereby said selected values of i and j represent the polarization of the signal.

6. Apparatus as claimed in claim 5 wherein said first and second groups of sets include different ones of said sets of summers and accumulators.

7. Apparatus as claimed in claim 6 wherein said one or more horizontal sample registers includes at least one first-stage horizontal sample register connected to said summers of said sets in said first group and at least one second-stage horizontal sample register connected to said summers of said sets in said second group, and wherein said one or more vertical sample registers includes at least one first-stage vertical sample register connected to said summers of said sets in said first group and at least one second-stage vertical sample register connected to said summers of said sets in said second group.

8. Apparatus as claimed in claim 7 wherein said sample registers are shift registers, each such shift register including a plurality of memory locations arranged in a series having an upstream end and a downstream end, each such memory location being operative to hold one sample, each such shift register being cyclically operative and arranged to move samples downstream in said series of memory locations on each cycle of such shift register, said summers of different sets being connected to different locations of said shift register, whereby the values of i and j used in different sets will be determined by the shift register locations to which said summers are connected and the k value will vary as samples are moved downstream within said shift registers.

9. Apparatus as claimed in claim 5 wherein said one or more ratio-determining circuits includes one or more ratio-determining circuits selectively connectable to said accumulators in different ones of said sets.

10. Apparatus as claimed in claim 5 wherein said one or more ratio-determining circuits includes a separate ratio-determining circuit associated with each said set and connected to said accumulators of the set associated with that ratio-determining circuit.

11. A method of determining the polarization of a signal from a series of horizontal sample values and a series of vertical sample values representing horizontal and vertical components of the signal, the method comprising the steps of:
   (a) calculating a plurality of series of output values, using a plurality of sets of transfer functions differing from one another, the calculations using at least some of the sets of different transfer functions and being conducted in parallel with other calculations using other transfer functions;
   (b) evaluating one or more characteristics of the series of output values computed using the transfer functions of the different sets, and selecting one or more series produced by one or more sets of calculations based on such evaluation to thereby select one or more sets of calculations and thus select the one or more transfer function used in such set, whereby each selected transfer function will provide information about the polarization of the signal.

12. A method as claimed in claim 11 wherein the values in each said series have indices such that values with different indices represent components at different times, each said transfer function being applied cyclically and specifying combination of samples in the two series with a reference sample value, each said transfer functions including one or more offsets specifying the differences between the index of the reference value used on a particular cycle and the index of each other value to be combined with the reference value on that cycle, the transfer functions of different sets including different offsets, whereby selection of a particular set of calculations will select particular offsets.

13. A method as claimed in claim 11 further comprising calculating one or more characteristics of each series of output values are in parallel with calculation of the output values in such series.

14. A method of determining the polarization of a signal having two orthogonal components comprising the steps of:
   (a) providing a series of N horizontal samples having values A( ) corresponding to the magnitude of the horizontal component at sampling intervals, where the parenthetical expression ( ) denotes an integer index and a set of N vertical series of samples having values B( ) corresponding to the magnitude of the vertical component at said sampling intervals;
   (b) using an arbitrary initial i offset such that $1 \leq i \leq N_1$, for each of a plurality of values of j such that $1 \leq j \leq N$, calculating $\Delta(k,i,j) = A(k) - B(k+i) - [A(k+j) + B(k+i+j)]$;

for a plurality of values of k such that $1 \leq k \leq N$, and accumulating a separate sum $\Sigma \Delta_j$ for each value of j by adding the values of $\Delta(k,i,j)$ calculated for said plurality of values of k, at least some of said separate sums $\Sigma \Delta_j$ for different values of j being accumulated in parallel with one another;

(c) using said arbitrary initial i offset, for each of said plurality of values of j, calculating $\Sigma(k,i,j) = A(k) - B(k+i) + [A(k+j) + B(k+i+j)]$ over said set of values of k and accumulating a separate sum $\Sigma \Sigma_j$ by adding the values of $\Delta(k,i,j)$ calculated for said plurality of values of k, at least some of said separate sums $\Sigma \Sigma_j$ for different values of j being calculated in parallel with one another;

(d) for each of said plurality of values of j, calculating a ratio of $\Sigma \Delta_j$ and $\Sigma \Sigma_j$;

(e) from said ratios calculated in step (d), selecting a maximum or minimum and the value of j corresponding to such maximum or minimum;

(f) using the value of j selected in step (e), for each of a plurality of values of i such that $1 \leq i \leq N$, calculating $\Delta(k,i,j) = A(k) - B(k+i) - [A(k+j) + B(k+i+j)]$ for a plurality of values of k such that $1 \leq k \leq N$, and accumulating a separate sum $\Sigma \Delta_i$ for each value of i by adding the absolute values of $\Sigma(k,i,j)$ calculated for said plurality of values of k, at least some of said separate sums $\Sigma\Delta_i$ for different values of i being accumulated in parallel with one another;

(g) using said value of j selected in step (e), for each of the values of i used in step (f), calculating $$\Sigma(k,i,j)=A(k)-B(k+i)+[A(k+j)+B(k+i+j)];$$

over the plurality of values of k used in step (f) and accumulating a separate sum $\Sigma\Sigma_i$ by adding the absolute values of $\Sigma(k,i,j)$ calculated for said plurality of values of k, at least some of said separate sums $\Sigma\Sigma_i$ for different values of i being accumulated in parallel with on another;

(h) for each of said plurality of values of i used in steps (f) and (g), calculating a ratio of $\Sigma\Delta_i$ and $\Sigma\Sigma_i$; and (j) from said ratios calculated in step (h), selecting a maximum or minimum and the value of i corresponding to such maximum or minimum.

* * * * *